G NEILSON.
Nut Lock.

No. 234,054.                    Patented Nov. 2, 1880.

WITNESSES
Frank G. Parker
William Edson

INVENTOR
George Neilson

UNITED STATES PATENT OFFICE.

GEORGE NEILSON, OF CHELSEA, MASSACHUSETTS.

NUT-LOCK.

SPECIFICATION forming part of Letters Patent No. 234,054, dated November 2, 1880.

Application filed September 1, 1879.

*To all whom it may concern:*

Be it known that I, GEORGE NEILSON, of Chelsea, county of Suffolk, and State of Massachusetts, have invented a new and useful Improved Nut-Lock, of which the following is a specification.

This invention relates to the peculiar construction of an attachment to be used, in connection with the bolt-screw, nut, and plate, to prevent the screw-nut from turning so as to unscrew and thus become loose.

The invention also relates to a guard forming a part of the locking-plate, which serves to prevent the screw-threads on the bolt from being injured by the thin edge of the locking-plate.

The nature of my invention consists in forming on the locking-plate a flange, which surrounds the bolt-hole made in the said plate, and in combining with the said flange edge-flanges for holding the lock-plate to the base and to the screw-nut.

Figure 1:
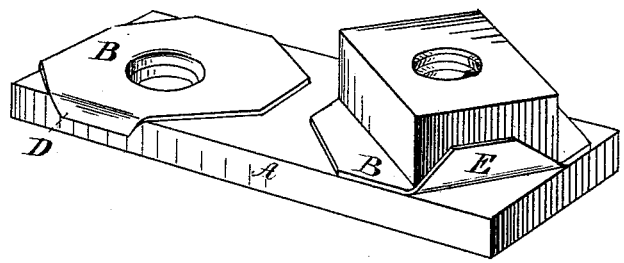
Figure 2:
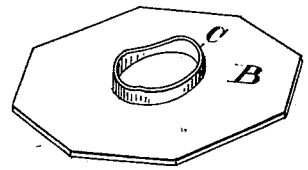

In the drawings, Figure 1 is a perspective view, showing a fish-plate such as used for the purpose of connecting rails on railways, with two of my locking-plates and one screw-nut, the bolt being omitted. Fig. 2 is a perspective view of the under side of the locking-plate, showing the flange that surrounds the bolt-hole.

In the drawing Fig. 1 I have shown my device in connection with an ordinary fish-plate in common use on railways, and I will explain my invention as thus applied.

Let A represent the fish-plate, having two bolt-holes, one at either end. These bolt-holes are usually made elliptical in form, so as to admit of a slight movement of the bolts, to allow for construction and expansion of the rails to which the fish-plates are applied, although, instead of having both holes elliptical in form, one may be round, and thus cause the entire slip to take place at one end of the plate.

The locking-plate B or B' is provided on its lower side with a flange, C, shaped to fit the hole in the fish-plate A. This flange C is round or oval to fit the hole to which it is applied. The function of the flange C is twofold: First, it serves as a guard to prevent the thin edge of the locking-plate B from injuring the thread on the bolt. This injury to the thread when the bolts are in use on railroads is very serious, and in consequence objection has been made to the use of these locking-plates. The second use of this flange is to assist, in combination with the flange D, Fig. 1, to hold the locking-plate more firmly to the fish-plate.

To hold the nut from turning around, the part of the locking-plate marked E is turned up, as shown in Fig. 1.

I am aware that locking-plates with flanges turned up against the fish-plate and nut are, in nut-locks, not new.

I claim—

An improved locking-plate provided with a continuous flange, C, around the bolt-hole, substantially as described, and for the purpose set forth.

GEORGE NEILSON.

Witnesses:
RAYMOND R. GILMAN,
A. W. GATES.